United States Patent Office 2,940,977
Patented June 14, 1960

2,940,977
5-AMINO-3-CYANO-2-PYRROLESULFONIC ACID DERIVATIVES AND SALTS THEREOF

William Joseph Middleton, Claymont, Del., assignor to E. I. du Pont de Nemours and Company, Wilmington, Del., a corporation of Delaware No Drawing. Filed Jan. 23, 1958, Ser. No. 710,599

19 Claims. (Cl. 260—286)

This invention relates to novel substituted pyrroles. More particularly, this invention relates to pyrroles having amino, cyano and sulfonic acid groups attached to nuclear carbon and to methods for their preparation.

Pyrrole is a five-membered nitrogen-containing heterocyclic compound which contains two nuclear carbon-to-carbon unsaturations and which unexpectedly resembles a benzenoid type of compound in many respects. Compounds containing the pyrrole nucleus occur frequently in the natural products such as in the porphyrins of chlorophyll and hemoglobin. Compounds containing this nucleus are becoming increasingly important in medicine and in industry.

It is an object of this invention to prepare pyrrolesulfonic acids and their salts containing nuclear substituted amino and cyano groups which compounds are useful as agricultural fungicides.

The acids of this invention are characterized by a pyrrole nucleus in which the two nuclear carbon atoms bonded to nuclear nitrogen bear an amino group and a sulfonic acid group respectively, one of the remaining nuclear carbon atoms bears a cyano group and the other remaining nuclear carbon atom is unsubstituted or is bonded to a hydrocarbon or a cyano group. These new pyrroles thus have attached to nuclear carbons an amino group, a sulfonic acid group and at least one cyano group. The acids have the general stucture,

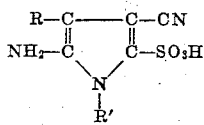

where R is selected from the group consisting of hydrogen, hydrocarbon and cyano radicals. R' is selected from the group consisting of hydrogen and aliphatic and cycloaliphatic hydrocarbon radicals. When R' is an aliphatic or cycloaliphatic hydrocarbon radical, the compound is monobasic and in reactions with salt-forming cations, will function as a monovalent radical. When R' is hydrogen, the compound can be monobasic or dibasic since the hydrogen bonded to the nitrogen is also replaceable with a salt-forming cation. Accordingly, it can react as a monovalent or divalent radical.

The compounds of this invention can be represented by the general structure,

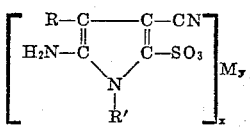

where M represents hydrogen or a salt-forming cation, R represents hydrogen, hydrocarbon or cyano groups, R' is selected from the group consisting of hydrogen, aliphatic and cycloaliphatic hydrocarbon radicals and the salt-forming cation M, and $x$ and $y$ are whole numbers whose values are determined by the valences of M and the pyrrolesulfonic acid radical by conventional and well-known rules.

The compounds of the invention can also be characterized as 5-amino-3-cyano-2-pyrrolesulfonic acids and their salts.

The novel substituted pyrrolesulfonic acids of the invention are obtained by the reaction of a 1,1,2-tricyanoethane having at least 2 carbons joined by a single bond, one of said carbons being bonded to two cyano groups and one hydrogen, the second of said carbons being bonded to one cyano group and one hydrogen, the remaining valence of said second carbon being satisfied by hydrogen, a cyano group or a hydrocarbyl group, with a bisulfite of the general formula $X(HSO_3)_n$ where X is an alkali or alkaline earth metal and $n$ has a value of 1 or 2. In the operation of the process the salt of the acid is formed from which the free acid is obtained by treatment of the salt solution with a mineral acid or with an acidic ion exchange resin such as, for example, a polystyrenesulfonic acid resin.

The pyrroles thus obtained have a hydrogen atom on the nuclear pyrrole nitrogen which may be replaced with an aliphatic or cycloaliphatic hydrocarbon group by well-known substitution procedures illustrated below. In the preferred form of the invention the number of carbons in the aliphatic or cycloaliphatic hydrocarbon group is not more than 18.

The 1,1,2-tricyanoethanes, which are used as reactants in the process of the invention are represented by the following structure,

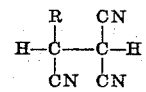

where R is selected from the class consisting of hydrogen, hydrocarbon and cyano groups.

When R in the above formula is hydrocarbon, it can be aliphatic, cycloaliphatic or aromatic in character. The number of carbons in the hydrocarbon groups is not critical. Because of availability of reactants and ease of conducting the reaction, compounds in which the R group contains at most 8 carbons are preferred. Examples of hydrocarbon groups which are representative of R are isobutyl, methallyl, octyl, naphthyl, cyclohexyl, and tolyl.

The 1,1,2-tricyanoethanes used as reactants in the process can be prepared by general methods which are disclosed in the literature. Thus, 1,1,2,2-tetracyanoethane can be prepared by the process of U.S. Patent 2,788,356. Methods of preparing representative 1,1,2-tricyanoethanes, including 1,1,2-tricyanoethane itself, are illustrated in the examples given in subsequent paragraphs.

The general process for preparing the acid and its salts is usually conducted in aqueous solution at a temperature lying within about 0° C. and 100° C., inclusive. The total concentration of reactants in solution is not critical and will be determined to some degree by the temperature at which the process is conducted. In general the total concentration of reactants in solution will lie between 5 and 35% by weight. The molar ratio of alkali or alkaline earth bisulfites to the 1,1,2-tricyanoethane will ordinarily lie between 1 and 3; the preferred ratio is from 1 to 2, inclusive. While the sole requirement is that there be at least equivalent weights of bisulfite and the tricyanoethane, an excess of bisulfite is preferred to assure complete reaction with the tricyanoethane.

Suitable bisulfites which may be used in the process, in addition to sodium, are lithium, potassium, magnesium, calcium and strontium.

Since the free acids become dark on exposure to air they are best handled in the form of their salts. In preparing the salts of the 5-amino-3-cyano-2-pyrrolesulfonic acids the salt-forming cation can react with the hydrogen on the sulfonic acid and also with the hydrogen bonded to the nitrogen of the ring. This is especially true of strongly basic metals such as alkali and alkaline earth metals. The sodium salts, for example of 5-amino-3,4-dicyano-2-pyrrolesulfonic acid, can have the formula $C_6H_3N_4O_3SNa$ or $(C_6H_2N_4O_3S)Na_2$. The calcium salts can have the formula $(C_6H_3N_4O_3S)_2Ca$ or $C_6H_2N_4O_3SCa$. The product obtained will be determined by the molar proportions of the salt-forming cation and the sulfonic acid used in the preparation.

The preparation of the metal salts can be accomplished by adding a water-soluble hydroxide or salt of the metal to an aqueous solution of the sulfonic acid. For heavy metal salts an aqueous solution of the sodium salt of the sulfonic acid may be used as the starting material. Separation and purification of the salts are accomplished by well-known chemical procedures. Examples of salts which can be obtained are those containing as the metal component potassium, magnesium, calcium, strontium, titanium, zirconium, chromium, manganese, iron, cobalt, nickel, copper, silver, zinc, mercury, aluminum, tin, lead, and antimony. An ammonium salt for example, ammonium 5-amino-3-cyano-2-pyrrolesulfonate, can be obtained by direct addition of ammonia to an aqueous solution of the acid.

A broad range of organic primary, secondary and tertiary amines can be used to prepare substituted ammonium salts of the acids. Typical examples of amines from which salts of the 5-amino-3-cyano-2-pyrrolesulfonic acids can be obtained are methylamine, diethylamine, isopropylamine, tributylamine, octylamine, dodecylamine, octadecylamine, allylamine, cyclohexylamine, N-methylcyclohexylamine, morpholine, aniline, N,N-dimethylaniline and pyridine.

The nuclear nitrogen in the compounds of this invention may be bonded, as stated earlier, to an aliphatic or cycloaliphatic hydrocarbon group by well-known pyrrole alkylation reactions. For example, 1-methyl-5-amino-3,4-dicyano-2-pyrrolesulfonic acid can be obtained by the interaction of methyl iodide and the dipotassium salt of 5-amino-3,4-dicyano-2-pyrrolesulfonic acid.

Examples of typical compounds which can be obtained by the processes described above are:

1-ethyl-5-amino-3-cyano-2-pyrrolesulfonic acid and its silver salt,
1-isopropyl-5-amino-3-cyano-4-methyl-2-pyrrolesulfonic acid and its nickel salt,
1-allyl-5-amino-3-cyano-4-isopropyl-2-pyrrolesulfonic acid and its manganese salt,
1-hexyl-5-amino-3-cyano-4-octyl-2-pyrrolesulfonic acid and its salt with pyridine,
1-cyclohexyl-5-amino-3-cyano-4-cyclopentyl-2-pyrrolesulfonic acid and its copper salt,
1-octyl-5-amino-3-cyano-4-naphthyl-2-pyrrolesulfonic acid and its salt with dimethylamine,
1-methyl-5-amino-3,4-dicyano-2-pyrrolesulfonic acid and its silver salt,
1-isopropyl-5-amino-3,4-dicyano-2-pyrrolesulfonic acid and its magnesium salt,
1-allyl-5-amino-3,4-dicyano-2-pyrrolesulfonic acid and its manganese salt,
1-hexyl-5-amino-3,4-dicyano-2-pyrrolesulfonic acid and its iron salt,
1-cyclohexyl-5-amino-3,4-dicyano-2-pyrrolesulfonic acid and its copper salt,
1-octyl-5-amino-3,4-dicyano-2-pyrrolesulfonic acid and its salt with dimethylamine,
1-dodecyl-5-amino-3,4-dicyano-2-pyrrolesulfonic acid and its salt with cyclohexylamine,
1-octadecyl-5-amino-3,4-dicyano-2-pyrrolesulfonic acid and its salt with aniline.

The following examples in which quantities are given as parts by weight illustrate the methods of preparing and the properties of the new compounds of the invention.

EXAMPLE I

A. Preparation of 1,1,2-tricyanoethane

α-Carboethoxysuccinonitrile is used as a reactant in this step and is prepared by the method of Higson and Thorpe, J. Chem. Soc. 89, 1460 (1906).

Approximately 405 parts of concentrated ammonium hydroxide (specific gravity, 0.90) is placed in a reaction vessel and cooled to $-5°$ C. and 250 parts of α-carboethoxysuccinonitrile is added with stirring at a rate such that the temperature of the reaction mass does not rise above 5° C. The mixture is stirred for 4.5 hours and filtered. The precipitate is collected, washed thoroughly with water and dried. There is obtained 143 parts of α-carbamoyl succinonitrile which, after crystallization from water, melts at 130–132.5° C. Analytical data are:

Calc'd for $C_5H_5N_3O$: C, 47.78; H, 4.07; N, 34.15. Found: C, 48.78; H, 3.97; N, 34.10.

A mixture of 73.8 parts of α-carbamoylsuccinonitrile, 100 parts of sodium chloride and about 235 parts of acetonitrile is stirred for 5 minutes, after which 49.2 parts of phosphorus oxychloride is added carefully. The resulting mixture is stirred and heated under reflux for 9 hours. The solution is cooled and filtered and the precipitate is washed with acetonitrile. The solvent is evaporated and the solid is crystallized from water. There is obtained 50.5 parts of 1,1,2-tricyanoethane which melts at 112.0–113.5° C.

Analysis.—Calc'd for $C_5H_3N_3$: C, 57.14; H, 2.86; N, 40.00. Found: C, 57.25; H, 2.82; N, 40.22.

B. Preparation of 5-amino-3-cyano-2-pyrrolesulfonic acid (sodium salt)

A mixture of 1.05 parts of 1,1,2-tricyanoethane, 1.04 parts of sodium bisulfite and 10 parts of water is heated under reflux for about 2 hours. The solution is treated with a small quantity of activated carbon and filtered. The filtrate is concentrated by heating on a steam bath to a viscous oil which is dried over phosphorus pentoxide at 70° C. and 2 mm. pressure. There is obtained 1.80 parts of the sodium salt of 5-amino-3-cyano-2-pyrrolesulfonic acid. The infrared spectrum of the solid is in agreement with the assigned structure. The sodium salt is a grayish-white very hygroscopic product which is difficult to purify. It is advantageously used in aqueous solution without special purification.

An aqueous solution of the free 5-amino-3-cyano-2-pyrrolesulfonic acid is obtained by dissolving the sodium salt in water and passing the solution repeatedly through a column packed with an acidic ion exchange resin, for example, a polystyrenesulfonic acid such as "Dowex 50-X." The free acid is obtained by evaporation of the aqueous solution but, since it is very hygroscopic, it is preferably handled in solution.

Example I illustrates the preparation of a compound of the invention in which the nuclear carbon in the 4-position is bonded to hydrogen.

EXAMPLE II 1,2,2-tricyanoethylbenzene is used as a reactant in this example and is prepared by the method of Corson and Stoughton, J. Am. Chem. Soc. 50, 2825 (1928).

A mixture of 7.20 parts of 1,2,2-tricyanoethylbenzene and 4.16 parts of sodium bisulfite in 50 parts of water is heated to boiling in a glass reaction vessel equipped with a reflux condenser. Refluxing is continued for 2 hours. The dark colored solution is acidified with hydrochloric acid and allowed to cool. A precipitate is formed which is separated by filtration and is then recrystallized from water to give 3.60 parts of 5-amino-3-cyano-4-phenyl-2-pyrrolesulfonic acid. The compound crystallizes as white needles which do not melt on heating but decompose at about 230° C.

Analysis.—Calc'd for $C_{11}H_9O_3N_3S$: C, 50.19%; H, 3.42%; N, 15.97%; S, 12.17%. Found: C, 50.38%, 50.45%; H, 3.68%, 3.43%; N, 15.51%, 15.83%; S, 12.26%, 11.93%.

Example II illustrates the preparation of a compound of the invention in which the nuclear carbon in the 4-position is bonded to a hydrocarbyl group. Other compounds, illustrative of this group, which can be prepared by the method of Example II are 5-amino-3-cyano-4-ethyl-2-pyrrolesulfonic acid from 1,1,2-tricyano-n-butane and 5-amino-3-cyano-4-(tert.-butyl)-2-pyrrolesulfonic acid from 1,1,2-tricyano-3,3-dimethyl-n-butane.

EXAMPLE III

A mixture of 4.8 parts of 1,1,2,2-tetracyanoethane, 7.7 parts of sodium bisulfite and 50 parts of water is heated until solution is complete. The solution is cooled and mixed with a solution of N-methylquinolinium iodide in 30 parts of water. The flaky precipitate which forms is collected on a filter, washed with water and recrystallized from water. There is thus obtained 3.5 parts of N-methylquinolinium 5-amino - 3,4 - dicyano-2-pyrrolesulfonate as glittering yellow plates which melts at 255–256° C. and yields the following data on analysis:

Calc'd for $C_{16}H_{13}N_5SO_3$: C, 54.07%; H, 3.69%; N, 19.71%; S, 9.02%. Found: C, 54.28%; H, 3.82%; N, 19.75%; S, 8.80%.

The salt is insoluble in cold water but it is quite soluble in 5% sodium bicarbonate solution.

Example III illustrates the preparation of a compound of the invention in which the nuclear carbon in the 4-position is bonded to a cyano group.

The compounds of this invention are useful as agricultural fungicides. Thus, the N-methylquinolinium salt of 5-amino-3,4-dicyano-2-pyrrolesulfonic acid in 0.2% concentration in aqueous acetone when applied as a spray gave 90% inhibition in the control of early blight in tomatoes. This salt, applied from 0.008% concentration in aqueous acetone, also gave 90% inhibition in the control of apple scab. In both cases there was no noticeable plant injury caused by the chemical compound.

EXAMPLE IV

A solution of 3.0 parts of N-methylquinolinium 5-amino-3,4-dicyano-2-pyrrolesulfonate, obtained in Example III is prepared in 50 parts of hot water. The solution is passed slowly through a column heated with steam and containing 14 parts of an acidic ion exchange resin, "Amberlite IR 120(H)." The solution is evaporated at room temperature under nitrogen and finally dried under reduced pressure over phosphorus pentoxide. There is obtained 1.5 parts of 5-amino-3,4-dicyano-2-pyrrolesulfonic acid which decomposes on melting, is very hygroscopic and becomes dark on exposure to air. Titration of the acid with sodium hydroxide, using a potentiometric procedure with a glass-calomel electrode pair, gives two peaks corresponding to neutralization of the hydrogen atoms on the sulfonic group and on the nitrogen of the pyrrole nucleus. The values, calculated and found, for the neutral equivalents are as follows:

Calc'd for $C_6H_4N_4O_3S$: (1) 212; (2) 106. Found: (1) 209, 212; (2) 106, 105.

The free 5-amino-3-cyano-2-pyrrolesulfonic acids are also prepared by passing aqueous solutions of the ammonium or potassium salts of the acid through a column containing the ion exchange resin described above.

The 5-amino-3-cyano-2-pyrrolesulfonic acids of this invention are useful as agents for removing deleterious copper compounds from petroleum hydrocarbons. Thus, when 5 parts of a gasoline hydrocarbon containing 10 parts per million of copper as copper napthenate is agitated at room temperature (about 25° C.) with 4 parts of water containing 0.05 part of 5-amino-3,4-dicyano-2-pyrrolesulfonic acid, the green color of the copper napthenate in the gasoline hydrocarbon layer disappears completely. Evaporation of the gasoline hydrocarbon layer leaves no copper-containing residue. A similar result is obtained when 5-amino-3 - cyano-4-phenyl-2-pyrrolesulfonic acid or 5-amino-3-cyano-4-octyl-2-pyrrolesulfonic acid is employed.

EXAMPLE V

To a solution of 5.05 parts of sodium bisulfite in 50 parts of water there is added 6.30 parts of 1,1,2,2-tetracyanoethane. The resulting slurry is heated on a steam bath until the solution is clear. The solution is treated with activated charcoal, cooled and filtered. To the resulting solution of the sodium salt of 5-amino-3,4-dicyano-2-pyrrolesulfonic acid there is added a solution of 11.8 parts of barium chloride ($BaCl_2 \cdot 2H_2O$) in 30 parts of water. The barium salt of 5-amino-3,4-dicyano-2-pyrrolesulfonic acid which precipitates is separated by filtration, washed with water and dried. There is obtained 3.30 parts of the gray crystalline barium salt.

By using a procedure similar to that described in Example V, there can be obtained the barium salts of other typical acids of this invention, for example, the barium salts of 5-amino-3-cyano-2-pyrrolesulfonic acid, 5-amino-3-cyano-4-phenyl-2-pyrrolesulfonic acid and of 5-amino-3-cyano-4-butyl-2-pyrrolesulfonic acid.

These salts are useful as intermediates in the preparation of other salts by reaction with metal sulfates.

Water soluble salts of the pyrrolesulfonic acids of the invention will also remove objectionable metal compounds from petroleum hydrocarbons. For example, when 8 parts of a gasoline hydrocarbon containing 0.1 part of cobalt trimethylhexoate is agitated at room temperature (about 25° C.) with a solution of 0.2 part of sodium 5-amino-3-cyano-2-pyrrolesulfonate in 5 parts of water for 1 minute the purple color of the cobalt compound in the gasoline hydrocarbon layer disappears completely. Evaporation of the gasoline hydrocarbon layer leaves no cobalt-containing residue.

This application is a continuation-in-part of application Serial No. 614,785 filed October 9, 1956, and now abandoned.

I claim:

1. In a method for preparing 5-amino-3-cyano-2-pyrrolesulfonic acid compounds having bonded to the carbon in the 4-position of the ring a member of the group consisting of hydrogen, cyano, and hydrocarbon groups of 1–8 carbon atoms, the step which comprises reacting a tricyanoethane having at least two carbons joined by a single bond, one of said carbons being bonded to two cyano groups and one hydrogen, the second of said carbons being bonded to one cyano group and one hydrogen, the remaining valence of said second carbon being satisfied by a member of the group consisting of hydrogen, cyano and hydrocarbon groups of 1–8 carbon atoms, with a bisulfite of the class consisting of alkali and alkaline earth metal bisulfites.

2. The process of claim 1 wherein the tricyanoethane is 1,1,2-tricyanoethane, and the bisulfite reactant is an alkali metal bisulfite.

3. In a method for preparing 5-amino-3,4-dicyano-2-pyrrolesulfonic acid compounds, the step which comprises reacting 1,1,2,2-tetracyanoethane with an alkali metal bisulfite.

4. 5-amino-3,4-dicyano-2-pyrrolesulfonic acid.

5. N-methylquinolinium 5-amino - 3,4 - dicyano-2-pyrrolesulfonate.

6. 5-amino-3-cyano-2-pyrrolesulfonic acid.

7. 5-amino-3-cyano-4-phenyl-2-pyrrolesulfonic acid.

8. A method for preparing 5-amino-3-cyano-2-pyrrolesulfonic acid which comprises passing a solution of a salt of the acid selected from the group consisting of alkali metal, ammonium, and amine salts, through an acidic ion exchange resin and collecting the effluent.

9. A method for preparing alkali and alkaline earth metal salts of 5-amino-3-cyano-2-pyrrolesulfonic acids having bonded to carbon in the 4-position of the ring a member of the group consisting of hydrogen, cyano, and hydrocarbon groups of 1–8 carbon atoms, which comprises reacting a 1,1,2-tricyanoethane with a bisulfite of the group consisting of alkali and alkaline earth metal bisulfites.

10. The sodium salt of 5-amino-3,4-dicyano-2-pyrrolesulfonic acid.

11. The barium salt of 5-amino-3,4-dicyano-2-pyrrolesulfonic acid.

12. The sodium salt of 5-amino-3-cyano-2-pyrrolesulfonic acid.

13. The process of claim 1 wherein the tricyanoethane is 1,1,2-tricyanoethane and the bisulfite reactant is an alkaline earth metal bisulfite.

14. In a method for preparing 5-amino-3,4-dicyano-2-pyrrolesulfonic acid compounds, the step which comprises reacting 1,1,2,2-tetracyanoethane with an alkaline earth metal bisulfite.

15. A compound of the formula

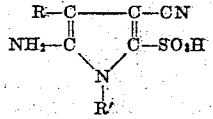

wherein R is selected from the group consisting of hydrogen, cyano, and hydrocarbon radicals of 1–8 carbon atoms; R' is selected from the group consisting of hydrogen, cycloalkyl and aliphatic hydrocarbon radicals of up to 18 carbon atoms; and the metal, ammonium and amine salts thereof.

16. Compounds according to claim 15 wherein the metal is an alkali metal.

17. Compounds according to claim 15 wherein the metal is an alkali earth metal.

18. In a method for preparing 5-amino-4-naphthyl-3-cyano-2-pyrrolesulfonic acid compounds, the step which comprises reacting a tricyanoethane having at least two carbons joined by a single bond, one of said carbons being bonded to two cyano groups and one hydrogen, the second of said carbons being bonded to one cyano group and one hydrogen the remaining valence of said second carbon being satisfied by a naphthyl group, with a bisulfite of the class consisting of alkali and alkaline earth metal bisulfites.

19. A compound of the formula

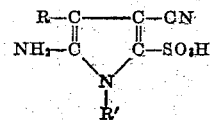

wherein R is naphthyl; R' is selected from the group consisting of hydrogen, cycloalkyl and aliphatic hydrocarbon radicals of up to 18 carbon atoms; and the metal, ammonium and amine salts thereof.

References Cited in the file of this patent

UNITED STATES PATENTS

| | | |
|---|---|---|
| 2,580,738 | De Benneville et al. | Jan. 1, 1952 |
| 2,779,766 | Middleton | Jan. 29, 1957 |
| 2,793,215 | Middleton | May 21, 1957 |
| 2,809,972 | Middleton | Oct. 15, 1957 |
| 2,836,602 | Rosch et al. | May 27, 1958 |
| 2,847,436 | Sauson | Aug. 12, 1958 |

OTHER REFERENCES

Chem. Abstracts, vol. 44, p. 4898 (1950), citing Terent'ev Doklady Akad. Nauk S.S.S.R., vol. 70, pp. 649–51 (1950).